US007155296B2

(12) United States Patent
Klasson et al.

(10) Patent No.: US 7,155,296 B2
(45) Date of Patent: Dec. 26, 2006

(54) CONFIGURATION METHOD FOR AN INSTALLATION COMPRISING SOLAR PROTECTION AND/OR LIGHTING DEVICES

(75) Inventors: Mattias Klasson, Göteborg (SE); Dirk Mommaerts, Rottenburg-Seebronn (DE)

(73) Assignee: Somfy SAS, Cluses (FR)

( * ) Notice: Subject to any disclaimer, the term of this patent is extended or adjusted under 35 U.S.C. 154(b) by 1 day.

(21) Appl. No.: 10/762,065

(22) Filed: Jan. 21, 2004

(65) Prior Publication Data

US 2004/0225379 A1 Nov. 11, 2004

(30) Foreign Application Priority Data

Jan. 24, 2003 (FR) .................................. 03 00798

(51) Int. Cl.

*G05B 11/01* (2006.01)
*G06F 3/00* (2006.01)
*G06F 9/00* (2006.01)
*G06F 17/00* (2006.01)
*G06F 9/24* (2006.01)
*G06F 15/177* (2006.01)
*G06F 9/445* (2006.01)

(52) U.S. Cl. ........................ 700/19; 715/700; 715/735; 713/1; 713/2; 709/222

(58) Field of Classification Search .................. 700/17, 700/19–20; 709/220–222; 340/825.21; 712/216

See application file for complete search history.

(56) References Cited

U.S. PATENT DOCUMENTS 5,598,000 A * 1/1997 Popat ......................... 250/206
5,663,621 A * 9/1997 Popat ......................... 318/480
5,838,226 A * 11/1998 Houggy et al. ........ 340/310.11
5,872,928 A * 2/1999 Lewis et al. ................ 709/222
6,064,949 A * 5/2000 Werner et al. .............. 702/134
6,546,419 B1 * 4/2003 Humpleman et al. ....... 709/223
6,574,234 B1 * 6/2003 Myer et al. ................. 370/462
6,969,954 B1 * 11/2005 Lys ............................ 315/155
2005/0275626 A1 * 12/2005 Mueller et al. ............. 345/156
2006/0049935 A1 * 3/2006 Giannopoulos et al. ..... 340/533

FOREIGN PATENT DOCUMENTS

DE 19615554 A1 10/1997
DE 10101745 A1 8/2002
EP 0752632 A2 1/1997
EP 0847164 A2 6/1998
EP 1054134 A1 11/2000

* cited by examiner

*Primary Examiner*—Anthony Knight
*Assistant Examiner*—Ronald D. Hartman, Jr.
(74) *Attorney, Agent, or Firm*—Frommer Lawrence & Haug LLP; Ronald R. Santucci

(57) ABSTRACT

The configuration method for an installation comprising solar protection and/or lighting devices controlled by a central unit comprising a memory, microprocessor and a user interface, is characterized in that method comprises an iteration, over all of the solar protection and/or lighting devices, and comprises a parameterization step that includes phases of entry and recording of data defining the exposure of the opening fitted with the solar protection device with respect to the sun, entry and recording of data defining the type of device, and entry and recording of data defining the maximum desired depth of penetration of the sun into the building, and/or the sought visual comfort. The method further comprises a calculation step whereby for each device, coefficients for a control algorithm and/or a control algorithm, intended to control the device, are calculated.

8 Claims, 4 Drawing Sheets

CONFIGURATION METHOD FOR AN INSTALLATION COMPRISING SOLAR PROTECTION AND/OR LIGHTING DEVICES

RELATED APPLICATIONS

The present application claims priority from co-pending French patent application serial no. FR 03 00798 filed on Jan. 24, 2003.

BACKGROUND OF THE INVENTION

The invention relates to a configuration method for an installation comprising solar protection and/or lighting devices controlled by a central unit comprising a memory, computing means and a user interface. It furthermore relates to an installation for the implementation of such a method, comprising solar protection and/or lighting devices controlled by a central unit comprising a memory, computing means and a user interface.

DESCRIPTION OF THE PRIOR ART

Control installations controlling a plurality of devices of different types are known in the prior art.

From the patent U.S. Pat. No. 4,567,557, the content of which is incorporated by reference, there is known an installation for automating the equipments of a building. It is organized in a central manner and controls a multiplicity of different equipments (air conditioning devices, alarm devices, lighting devices) in response to the reception of data coming from sensors. The connection with a computer makes it possible to program and store in memory a set of user behavior cases according to which the installation will react and control the different equipments.

From the utility certificate application FR 2 721 767, the content of which is incorporated by reference, there is known a control installation connected to different equipments. It comprises a control device whose control keys make it possible to select the equipments to control and to transmit control instructions, in association with service parameters, in such a way as to control the equipments in the desired way. It is also possible to store and recall entire predefined scenarios.

In these two cases, each controlled equipment involves a specific configuration, that is to say an entry of parameters and operating programs for each equipment. Two equipments whose operation is similar will also have to be subjected to specific programming, which makes the configuration and the programming tedious.

From the patent application EP 1 054 134, the content of which-is incorporated by reference, there is known an installation that partially addresses this problem. In fact it describes a method of managing the operation of motorized closings of a building, such as blinds, rolling shutters or similar. The method consists in connecting the motorized equipments to a central management server via an intelligent unit, and in controlling the motorized equipments with respect to pre-recorded command instructions, to variable parameters and to selected threshold values and data contained in a database capable of being updated periodically. The method furthermore comprises the updating of the database by the intermediary of external data servers. An automated central management method for a set of equipments functioning in a similar manner is therefore known. However, in the case of the patent application EP 1 054 134, the functional similarities and differences of the equipments are not or are hardly taken into account for facilitating the programming and the entry of parameters for the automation of the management of the set of motorized equipments.

From the application DE 196 15 554, the content of which is incorporated by reference, there is known a management method for a set of motorized screening equipments, where the particular feature of Venetian blinds regarding the orientation of the blades is taken into account. Even though this particular taking into account represents an advantage in the programming, it is more a matter of management by way of exception than a simplification of the method of configuration of the different controlled equipments, taking account of their similarities and differences.

SUMMARY OF THE INVENTION

The purpose of the invention is to propose a configuration method improving the methods known in the prior art and overcoming the aforesaid disadvantages. In particular, the invention proposes a simple configuration method, reducing the amount of data to be entered. The invention also proposes an installation intended to implement this method.

The configuration method is characterized in that it comprises the following steps:

a parameterization step comprising an iteration, over all of the solar protection and/or lighting devices, of at least one of the following phases:

entry and recording of data defining the exposure of the opening fitted with the solar protection device with respect to the sun, entry and recording of data defining the type of the solar protection and/or lighting device, entry and recording of data defining the maximum desired depth of penetration of the sun into the building, and/or the sought visual comfort, a step of iterative calculation over all of the solar protection and/or lighting devices during which, for each device, coefficients for a control algorithm and/or a control algorithm, intended for the control of the device, are calculated on the basis of the data recorded in memory and of general information characterizing the different types of solar protection and/or lighting and contained in memory.

The method can also comprise an iteration, over all of the solar protection and/or lighting devices, of the following steps:

a parameterization step comprising the following phases:

entry and recording of data defining the exposure of the opening fitted with the solar protection device with respect to the sun, entry and recording of data defining the type of the solar protection and/or lighting device, entry and recording of data defining the maximum desired depth of penetration of the sun into the building, and/or the sought visual comfort, a step of calculation during which, for each device, coefficients for a control algorithm and/or a control algorithm, intended to control the device, are calculated on the basis of the data placed in memory during the parameterization step and of general information characterizing the different types of solar protection and/or lighting.

The data defining visual comfort can, for example, consist in a range of illumination values or a luminance ratio.

According to an additional feature, the method comprises a step during which the coefficients and/or the control algorithms are modified in order to manage conflicts and interactions between the different devices.

Advantageously, a single item of data defines the type of solar protection and/or lighting device.

The installation according to the invention is characterized in that information relating to the types of solar protection and/or lighting devices is stored in memory.

The installation can comprise means making it possible to duplicate the results of one or more steps of the above method in order to generate the coefficients and7or the control algorithms of certain solar protection and/or lighting devices. In fact when, for example, the solar protection devices of the same type are exposed in the same way, they can be controlled by the same algorithm.

The method and the installation make it possible to control different devices related to solar protection and lighting, taking account of their common functionalities and of their specific features, by the use of data relating to their types and stored in memory. Thus, few parameters have to be entered in order to allow the central unit to transmit adapted commands to each of the devices and thus to manage the user's comfort in the building in the best way. The memory furthermore contains information and algorithms defining the general operation of different types of solar protection devices, in particular as a function of the position of the sun. There are also computing algorithms based on general principles, making it possible, for example, to calculate the position of the sun as a function of the date and the time.

The central unit comprises computing means making it possible to generate algorithms and/or instruction values intended for the control of the solar protection devices.

According to the various fixed parameters (principally entered by the user), variables (principally given by sensors and/or by a clock) and information contained in memory, the central unit automatically calculates, for the different devices used, the operational values (for example position, orientation, intensity, etc) useful for optimizing the user's comfort.

There are several types of solar protection devices. These different types have a common general function, which is to favor or to limit the entrance of direct sunlight into a building through openings. However, they function in different ways.

For example, the Venetian blind combines criteria relating to the position and to the orientation of the blades, whilst the screen blind comprises a criterion of position and possibly a criterion of opacity. For an awning blind, the angle of deployment characterizes the protection.

The various values associated with the types of solar protection devices are stored in the memory, from where they can be used by the computing means of the installation. The data contained in the memory can be associated with operating modes, with behavioral laws or with tables of instructions.

Similarly, various values relating to lighting devices can be stored in the memory.

Parameters (other than those making it possible to define the exposure of the openings, the maximum desired depth of penetration of the sun and to define the type of solar protection devices)can be provided in order to refine the control of the devices.

As a function of the fixed parameters, the central unit generates an operational algorithm specific to each device and thus automatically ensures the management of the different devices.

Furthermore, as a function of these specific algorithms, the central unit is capable of managing the interactions between the devices and to do so even in the case of several protection devices equipping a same room of a building or a same opening.

The operational algorithms can assume several forms, such as for example:

functions returning the images of the fixed parameters and of the variable parameters, tables of predefined values, fuzzy logic tables.

The installation integrates the different criteria in order to automatically generate the control 20 instructions specific to a type of device.

Advantageously, the installation comprises means for duplicating the operational algorithms in the case where several identical devices, exposed in an equivalent manner, are controlled. These means can, for example, allow the repetition of all of the fixed parameters for these devices.

Different installations can be connected in parallel by a bus line. In this case, means of duplication from one installation to another can also be provided.

The final purpose of such an installation is to create a comfortable environment for the user and to manage energy in order to limit its consumption.

BRIEF DESCRIPTION OF THE DRAWINGS

The appended drawing shows, by way of example, an embodiment of the configuration method according to the invention and an embodiment of the installation according to the invention.

DESCRIPTION OF THE PREFERRED EMBODIMENTS

Figure 1:
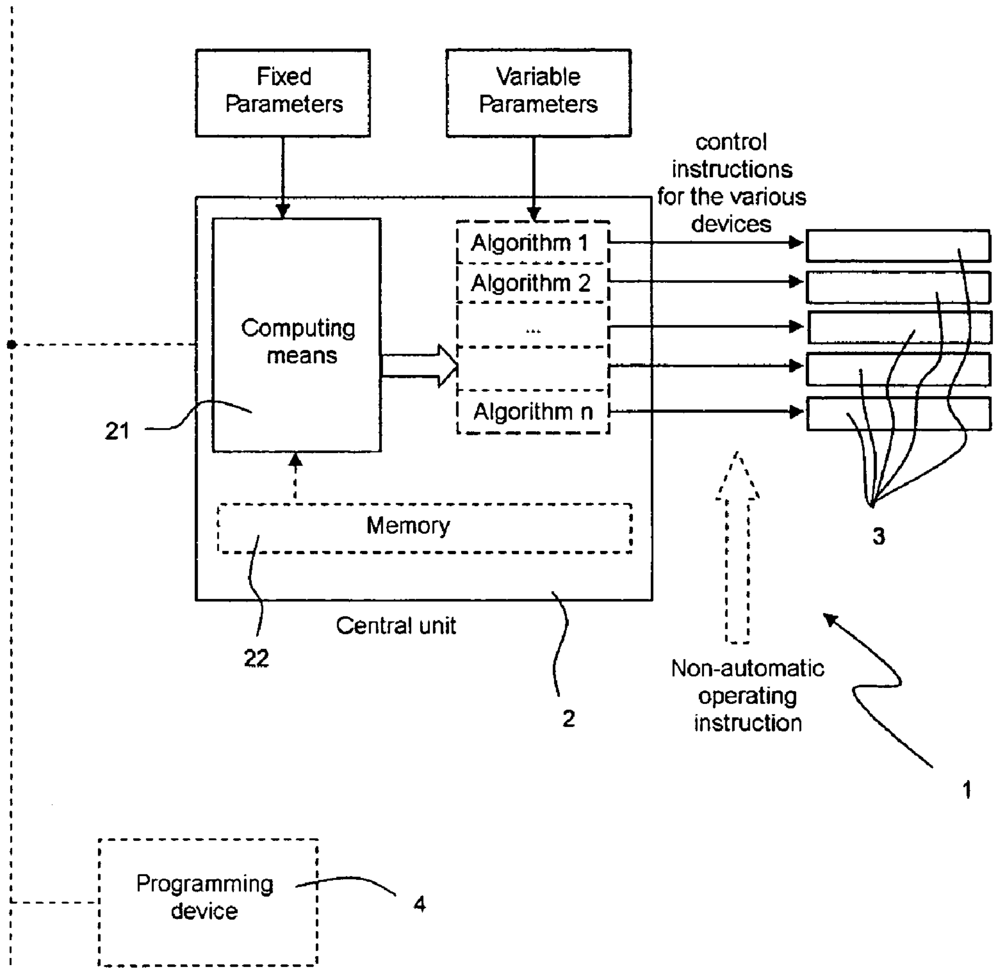
FIG. 1 is a block diagram of the installation according to the invention.

The installation shown in FIG. 1 comprises a central control unit 2 controlling motorized solar protection devices 3 equipping the openings of a building. They could also be lighting devices for rooms of the building provided with such openings. The central unit can be connected by a bus line, possibly in a network with other similar central control units.

The central control unit 2 can be configured directly or by the intermediary of a programming device 4, such as a computer. In the first case, the control system has a screen and an interface of the keyboard type upon which the data necessary for the operation of the installation is entered.

The central control unit 2 comprises computing means 21 such as a microprocessor and possibly a memory 22.

The installation receives on the one hand fixed parameters, during an initialization phase. These fixed parameters are of immutable nature, at least until modification of the characteristics of the solar protection and/or lighting devices during a renovation of the building. They consist, for example, of information defining the exposure of each opening of the building provided with a solar protection device and the different types of solar protection devices used in the building. This information is recorded in memory.

On the other hand, the installation receives variable parameters, after the initialization phase. These variable parameters consist of information on time, supplied by a clock, and of meteorological data on wind, temperature and illumination coming from various sensors and making it possible to define the internal and external environments of the building varying over the course of time.

The memory contains information relating, on the one hand, to the technical operational characteristics of the motorized solar protection and/or lighting devices of different types and, on the other hand, general information, such as for example the determination of the movement of the sun over the course of the year, the management of energy in the building and the management of the occupation of the building. All or some of this information can be stored in the memory before the installation of the central control unit in the building, for example by the manufacturer of the said central control unit.

It is also possible for this memory to form part of the independent programming device 4. It can then also be common with a control installation assembly.

The information contained in the memory is used by the computing means in order to provide, as a function of the fixed parameters entered in the memory of the installation, specific operational algorithms for each controlled device, or at least specific coefficients for each controlled device that are usable by a same algorithm.

By way of example, the index "i" denotes one of the solar protection and/or lighting devices.

The following fixed parameters are entered and recorded during the parameterization phase:

Fi: parameters relating to the exposure of the opening provided with the device, if the device is a solar protection device, D1i: parameters relating to the device, Li: parameters related to a choice of visual comfort in the zone covered by the device. The following information is read from memory:

D2i: other parameters relating to the device.

It is assumed that the variable parameters are time T and external sunshine, measured by the frontal illumination E.

In a first case, the central unit comprises computing means which will generate as many algorithms Ai as there are different products or products subjected to different conditions: thus the control law of a device is expressed by Ai(T, E), in which the algorithm Ai is itself dependent on Fi, D1i, D2i, Li.

In a second case, the central unit comprises computing means which will generate as many groups of coefficients Ci as there are different products or products subjected to different conditions. These coefficients are used by a same algorithm: thus the control law of a device is expressed by Ai(Ci, T, E) in which the coefficients Ci are dependent on Fi, D1i, D2i, Li.

The central unit also manages the interactions between the solar protection and/or lighting devices: thus the algorithms specific to each device take account of this management.

The control instructions of the solar protection and/or lighting devices are then generated on the basis of the algorithms and/or operational instruction values and variable parameters.

A non-automatic instruction to operate a solar protection device can possibly replace or temporarily invalidate the instructions provided by the central unit.

Figure 2:
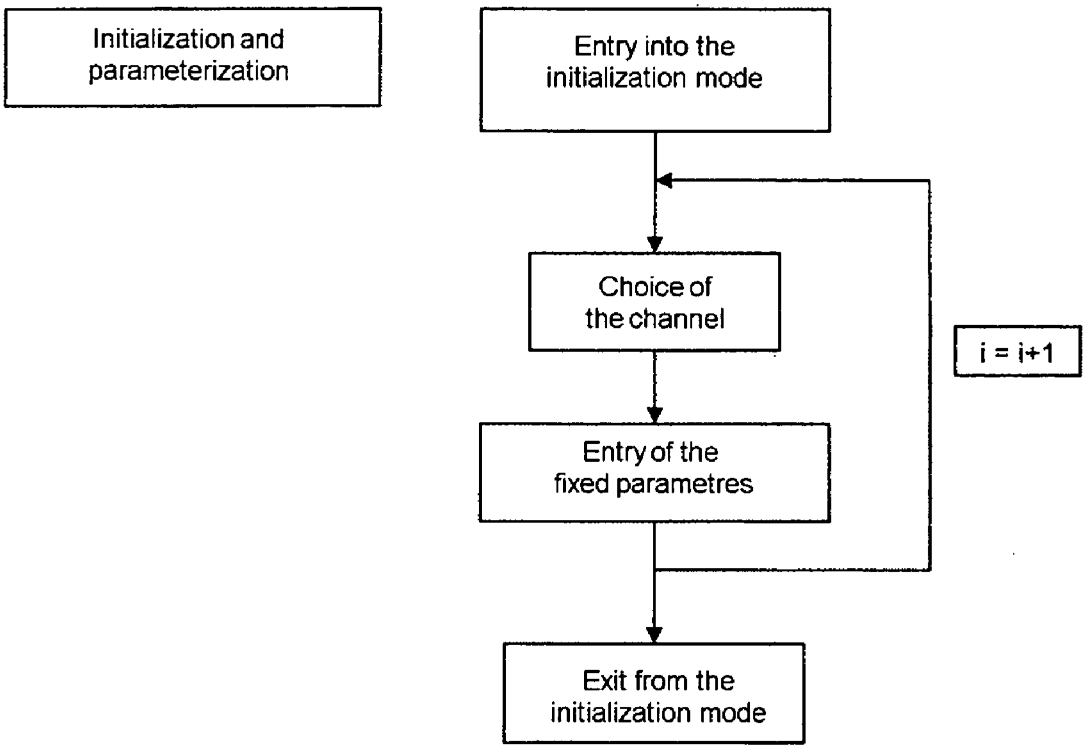
FIG. 2 is a flowchart illustrating a first phase of the configuration method of the installation according to the invention.

In a first phase, referred to as the parameterization phase, diagrammatically represented in FIG. 2, the user or the installer enters the fixed parameters specific to each controlled solar protection and/or lighting device. He must then enter the initialization mode. Then, he must select a control output and enter fixed parameter values corresponding to the solar protection device controlled by that output. These parameters are stored in the memory of the installation. These steps must be iterated on all of the outputs controlling a device. It is not obligatory for all of the control outputs of the central unit to be connected to a device. These fixed parameters consist, for example and as seen previously, of values defining the exposure of the opening equipped by the device and of a value defining the type of solar protection. The fixed parameters defining the type of solar protection and/or lighting device can be stored in memory automatically, for example during an initial communication between the central unit and each of the controlled devices.

Figure 3:
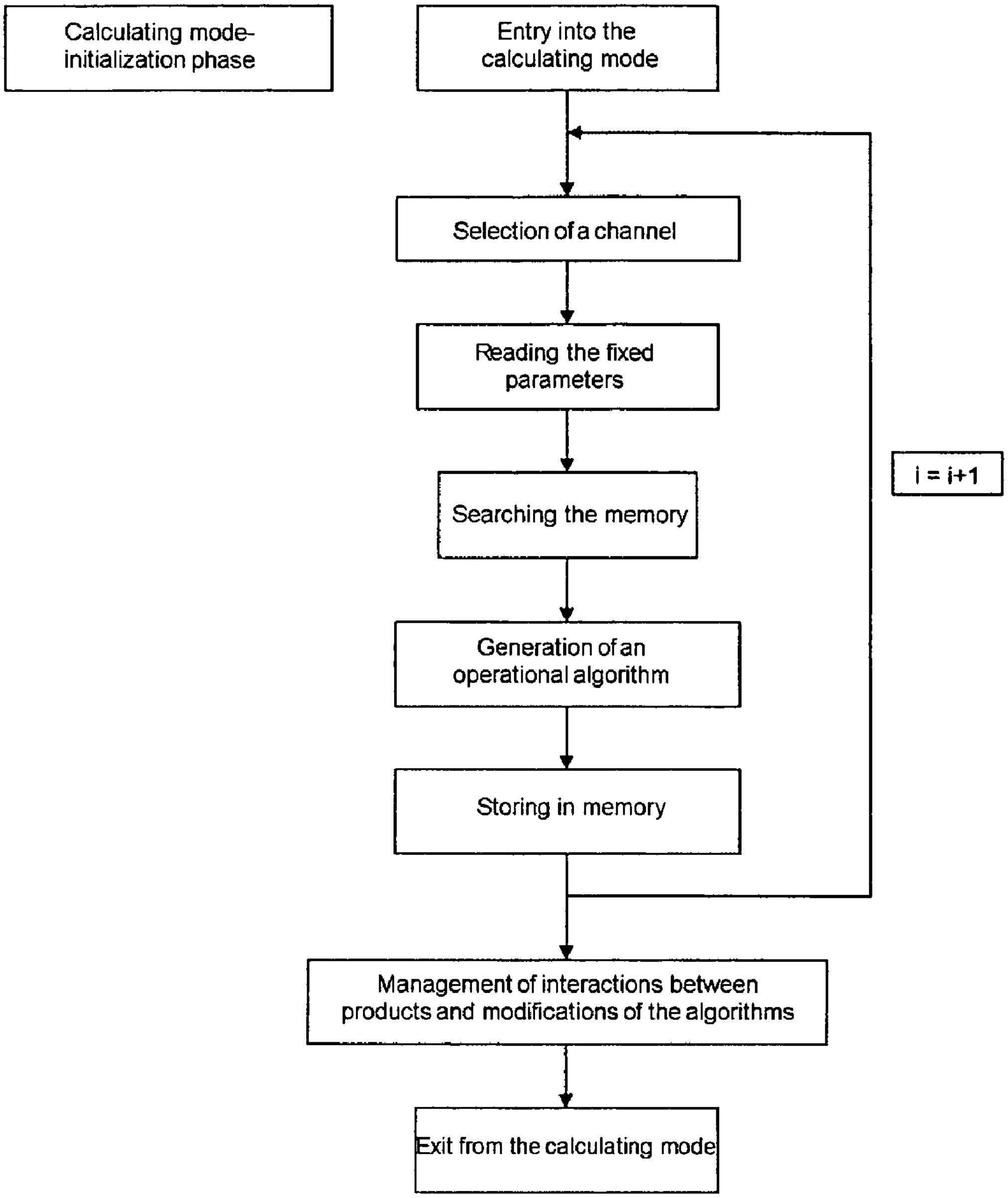
FIG. 3 is a flowchart illustrating a second phase of the configuration method of the installation according to the invention.

In a second phase, referred to as the initialization and computing phase, diagrammatically represented in FIG. 3, the computing means 21 use both the fixed parameters stored in memory and the general information, which is also stored in memory, in order to determine operational algorithms for the solar protection devices, and/or coefficients for such an algorithm. The user must cause the entry into a computing mode. He must select a control output of the central unit. The computing means then read the fixed parameters relating to the solar protection device controlled by the chosen control output. The computing means then use the general information stored in memory in combination with the fixed parameters in order to produce an operational algorithm, and/or coefficients for an operational algorithm of the device connected to the selected control output. These different steps are also iterated automatically on all of the outputs of the central unit controlling a solar protection device. Once the algorithms are established independently for each device, the central unit checks that the operations induced by these algorithms do not risk generating contradictions. If such is the case, it modifies the corresponding algorithms in order to manage the conflicts and the interactions.

Once this phase is completed, the installation is configured and operational.

Figure 4:
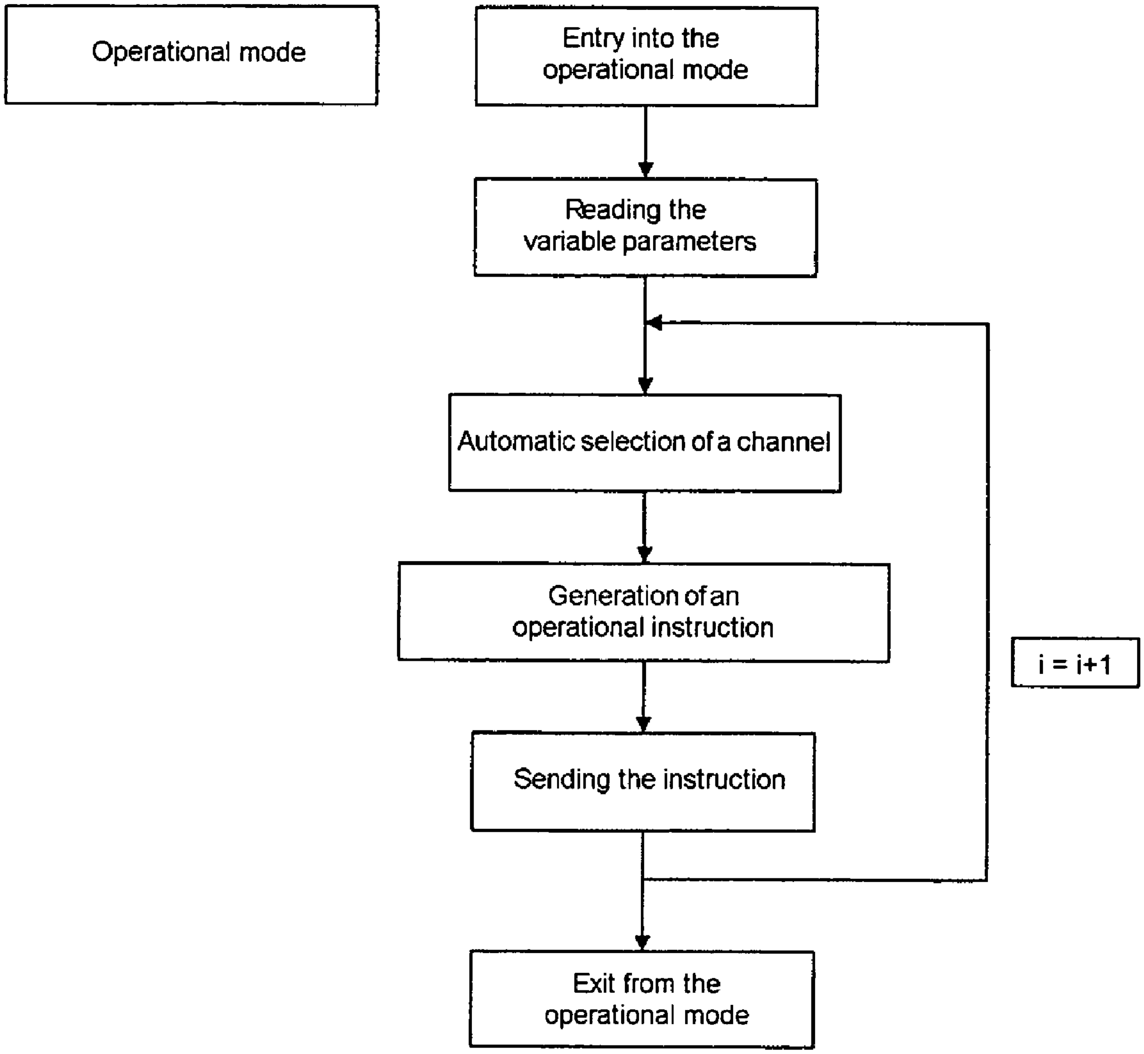
FIG. 4 is a flowchart illustrating the operating mode of the installation according to the invention.

Periodically and automatically, the installation switches into the operational mode shown in FIG. 4. The variable parameters coming from different sensors and a clock are read and integrated in the operational algorithms in order to generate control instructions governing the operation of the solar protection and/or lighting devices. A control output is selected automatically, the variable parameters are integrated in an operational algorithm in order to generate a control instruction for the solar protection and/or lighting device controlled by the selected control output, then the instruction is sent to the device. These steps are iterated on all of the outputs controlling a solar protection and/or lighting device.

What is claimed is:

1. A configuration method for an installation (1) comprising solar protection devices (3) controlled by a central unit (2) comprising a memory (22), computing means (21) and a user interface, wherein the method comprises the following steps:

a parameterization step comprising an iteration, over all of the solar protection devices (3), of at least two of the following phases:

(a) entry and recording of data defining an exposure of an opening fitted with the solar protection device (3) with respect to the sun;

(b) entry and recording of data defining a type of solar protection device; and (c) entry and recording of data defining the maximum desired depth of penetration of the sun into a building, and/or a desired visual comfort;

a step of iterative calculation over all of the solar protection devices (3), whereby for each device, a control algorithm and/or coefficients for the control algorithm, intended for the control of the device, are calculated on the basis of the data, which is recorded in memory, and of general information characterizing the different types of solar protection devices and contained in memory;

a step, whereby the coefficients and/or the control algorithms are modified in order to manage conflicts and interactions between different devices; and a step of controlling the solar protective devices in an operational mode in accordance with the control algorithm.

2. The configuration method as claimed in claim 1, wherein a single item of data defines the type of solar protection device.

3. A configuration method for an installation (1) comprising solar protection devices (3) controlled by a central unit (2) comprising a memory (22), computing means (21) and a user interface, wherein the method comprises the following steps:

a parameterization step comprising an iteration, over all of the solar protection devices (3), of at least two of the following phases:

(a) entry and recording of data defining an exposure of an opening fitted with the solar protection device (3) with respect to the sun;

(b) entry and recording of data defining a type of solar protection device; and (c) entry and recording of data defining the maximum desired depth of penetration of the sun into a building, and/or a desired visual comfort;

a step of iterative calculation over all of the solar protection devices (3), whereby for each device, a control algorithm and/or coefficients for the control algorithm, intended for the control of the device, are calculated on the basis of the data, which is recorded in memory, and of general information characterizing the different types of solar protection devices and contained in memory;

a step of duplicating the results of one or more of the preceding steps in order to generate the coefficients and/or the control algorithms of certain solar protection device; and a control step for controlling the solar protective devices in an operational mode in accordance with the control algorithm.

4. The configuration method as claimed in claim 3, wherein a single item of data defines the type of solar protection device.

5. A configuration method for an installation (1) comprising solar protection devices (3) controlled by a central unit (2) comprising a memory (22), computing means (21) and a user interface, wherein the method comprises an iteration, over all of the solar protection devices (3), of the following steps:

a parameterization step comprising at least two of the following phases:

(a) entry and recording of data defining an exposure of an opening fitted with the solar protection device (3) with respect to the sun;

(b) entry and recording of data defining a type of solar protection device; and (c) entry and recording of data defining the maximum desired depth of penetration of the sun into a building, and/or a desired visual comfort;

a calculation step, whereby for each device, a control algorithm and/or coefficients for the control algorithm, intended to control the device, are calculated on the basis of the data, which is placed in memory during the parameterization step, and of general information characterizing the different types of solar protection devices, a step, whereby the coefficients and/or the control algorithms are modified in order to manage conflicts and interactions between different; and controlling the solar protective devices in an operational mode in accordance with the control algorithm.

6. The configuration method as claimed in claim 5, wherein a single item of data defines the type of solar protection device.

7. A configuration method for an installation (1) comprising solar protection devices (3) controlled by a central unit (2) comprising a memory (22), computing means (21) and a user interface, wherein the method comprises an iteration, over all of the solar protection devices (3), of the following steps:

a parameterization step comprising at least two of the following phases:

(a) entry and recording of data defining an exposure of an opening fitted with the solar protection device (3) with respect to the sun;

(b) entry and recording of data defining a type of solar protection device;

(c) entry and recording of data defining the maximum desired depth of penetration of the sun into a building, and/or a desired visual comfort;

a calculation step, whereby for each device, a control algorithm and/or coefficients for the control algorithm, intended to control the device, are calculated on the basis of the data, which is placed in memory during the parameterization step, and of general information characterizing the different types of solar protection devices; and a step of duplicating the results of one or more of the preceding steps in order to generate the coefficients and/or the control algorithms of certain solar protection device; and controlling the solar protective devices in an operational mode in accordance with the control algorithm.

8. The configuration method as claimed in claim 7, wherein a single item of data defines the type of solar protection device.

* * * * *